US012455926B2

(12) United States Patent
Hwang et al.

(10) Patent No.: US 12,455,926 B2
(45) Date of Patent: Oct. 28, 2025

(54) METHOD OF CRAWLING WEBSITE BY BYPASSING BOT DETECTION

(71) Applicant: S2W INC., Seongnam-si (KR)

(72) Inventors: In Wook Hwang, Seongnam-si (KR); Joon Seok Yang, Seoul (KR); Woo Seok Kim, Seoul (KR)

(73) Assignee: S2W INC., Seongnam-si (KR)

( * ) Notice: Subject to any disclaimer, the term of this patent is extended or adjusted under 35 U.S.C. 154(b) by 0 days.

(21) Appl. No.: 17/842,280

(22) Filed: Jun. 16, 2022

(65) Prior Publication Data

US 2023/0259562 A1   Aug. 17, 2023

(30) Foreign Application Priority Data

Feb. 11, 2022   (KR) ........................ 10-2022-0017964

(51) Int. Cl.
  *G06F 16/951*   (2019.01)
  *H04L 67/02*   (2022.01)
  *H04L 67/56*   (2022.01)

(52) U.S. Cl.
  CPC ............ *G06F 16/951* (2019.01); *H04L 67/02* (2013.01); *H04L 67/56* (2022.05)

(58) Field of Classification Search
  CPC ........ G06F 16/951; H04L 67/56; H04L 67/02
  See application file for complete search history.

(56) References Cited

U.S. PATENT DOCUMENTS

| | | | |
|---|---|---|---|
| 9,075,990 B1* | 7/2015 | Yang | H04L 63/20 |
| 9,361,446 B1* | 6/2016 | Demirjian | H04L 63/1441 |
| 2013/0198266 A1* | 8/2013 | Kiley | H04L 67/02 |
| | | | 709/203 |
| 2014/0250538 A1* | 9/2014 | Rapaport | G06F 21/31 |
| | | | 726/28 |
| 2018/0114001 A1* | 4/2018 | Jain | H04L 63/083 |
| 2021/0049234 A1* | 2/2021 | Kumar | G06F 40/117 |
| 2021/0326399 A1* | 10/2021 | Hayes | G06F 16/951 |
| 2022/0261473 A1* | 8/2022 | Zhai | G06F 21/42 |

* cited by examiner

*Primary Examiner* — Courtney Harmon
(74) *Attorney, Agent, or Firm* — Sughrue Mion, PLLC (57) ABSTRACT

The present disclosure relates to a method of crawling a website by a terminal. The method may include a method of crawling a website by a terminal including: modifying a header included in a hypertext transfer protocol (HTTP) request message to avoid bot detection; transmitting the HTTP request message to a client server through a proxy server providing a dynamic Internet protocol (IP); receiving a response message for accessing the website from the client server; collecting a tag for confirming an element displayed on a user screen in the response message; and performing the crawling based on the confirmation result.

6 Claims, 7 Drawing Sheets

METHOD OF CRAWLING WEBSITE BY BYPASSING BOT DETECTION

CROSS-REFERENCE TO RELATED APPLICATION

This application claims priority to and the benefit of Korean Patent Application No. 10-2022-0017964, filed on Feb. 11, 2022, the disclosure of which is incorporated herein by reference in its entirety.

BACKGROUND

1. Field of the Invention

The present disclosure relates to a method and apparatus for crawling a website by bypassing bot detection in order to prevent website collection from being restricted by being detected by a bot during the website collection.

2. Discussion of Related Art

Crawling is an act of collecting data while roaming on the Web. Software that may perform such crawling is called a crawler. A main purpose of crawling is to roam multiple web pages instead of collecting data, and the crawling is a task to classify where data is stored and related locations.

A bot is a software application programmed to perform a specific task. Bots are automated, and thus run according to instructions without being run by users themselves. In addition, bots may often imitate or perform human acts. Therefore, bots may perform repetitive tasks much faster than humans. Most bots operate on networks, and crawlers may operate as bots.

SUMMARY OF THE INVENTION

The present disclosure is directed to crawling a website by bypassing bot detection.

Objects of the present disclosure are not limited to the above-described objects. That is, other objects that are not described may be obviously understood by those skilled in the art to which the present disclosure pertains from the following detailed description.

According to an aspect of the present disclosure, there is provided a method of crawling a website by a terminal, including: modifying a header included in a hypertext transfer protocol (HTTP) request message to avoid bot detection; transmitting the HTTP request message to a client server through a proxy server providing a dynamic Internet protocol (IP); receiving a response message for accessing the website from the client server; checking an element displayed on a user screen in the response message; and performing the crawling based on the checked result.

The modifying of the header may include modifying a first field for identifying the terminal.

The modifying of the header may include modifying a second field including an access address of the terminal.

The second field may be modified to a domain address of the website.

The proxy server may be a high anonymous proxy server.

The response message may include an element of the website expressed in a programming language.

The performing of the crawling may include: checking a path corresponding to an element displayed on the user screen based on a tag; and crawling an element corresponding to the path.

The method may further include receiving an image for checking Captcha; and solving the Captcha through an artificial intelligence model.

The method may further include, when the solution of the Captcha through the artificial intelligence model fails, transmitting an image for checking the Captcha to a user through a social networking service (SNS).

According to an aspect of the present disclosure, there is provided a terminal for crawling a website, including: a communication module; a memory including an artificial intelligence model; and a processor configured to functionally control the memory, in which the processor may modify a header included in an HTTP request message to avoid bot detection, transmit the HTTP request message to a client server through a proxy server providing a dynamic IP, receive, from the client server, a response message for accessing the website, collect a tag for checking an element displayed on a user screen in the response message, and perform the crawling based on the checked result.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

The accompanying drawings, which are included as part of the detailed description to assist with understanding of the present disclosure, illustrate embodiments of the present disclosure and explain the technical features of the present disclosure together with the detailed description.

DETAILED DESCRIPTION OF EXEMPLARY EMBODIMENTS

Hereinafter, embodiments of the present disclosure will be described in detail with reference to the accompanying drawings. The same or similar components will be denoted by the same reference numerals throughout the drawings, and overlapping description of the same or similar components will be omitted. In addition, the terms "module" and "unit" for components used in the following description are used only to simplify the disclosure. Therefore, these terms do not have meanings or roles that are distinguished from each other in themselves. In addition, in describing the embodiments disclosed in the present disclosure, when it is determined that detailed description of a related known technology may obscure the gist of the embodiment disclosed in the present disclosure, such detailed description will be omitted. Further, it should be understood that the attached drawings are only for easy understanding of the embodiments disclosed in the present disclosure, do not limit the technical idea disclosed in the present disclosure, and include all changes, equivalents or substitutes included in the spirit and scope of the present disclosure.

Terms including ordinal numbers such as "first," "second," and the like, may be used to describe various components. However, these components are not limited by these terms. The terms are used only to distinguish one component from another component.

It is to be understood that when one component is referred to as being "connected to" or "coupled to" another component, the one component may be connected directly to or coupled directly to another component or may be connected to or coupled to another component with still another component interposed therebetween. On the other hand, it should be understood that when one element is referred to as being "connected directly to" or "coupled directly to" another element, it may be connected to or coupled to another element with no other element interposed therebetween.

Singular forms are intended to include plural forms unless the context clearly indicates otherwise.

It will be further understood that the terms "include" or "have" used in the present disclosure specify the presence of features, numerals, steps, operations, components, parts described in the present disclosure, or combinations thereof, but do not preclude the presence or addition of one or more other features, numerals, steps, operations, components, parts, or combinations thereof.

Figure 1:
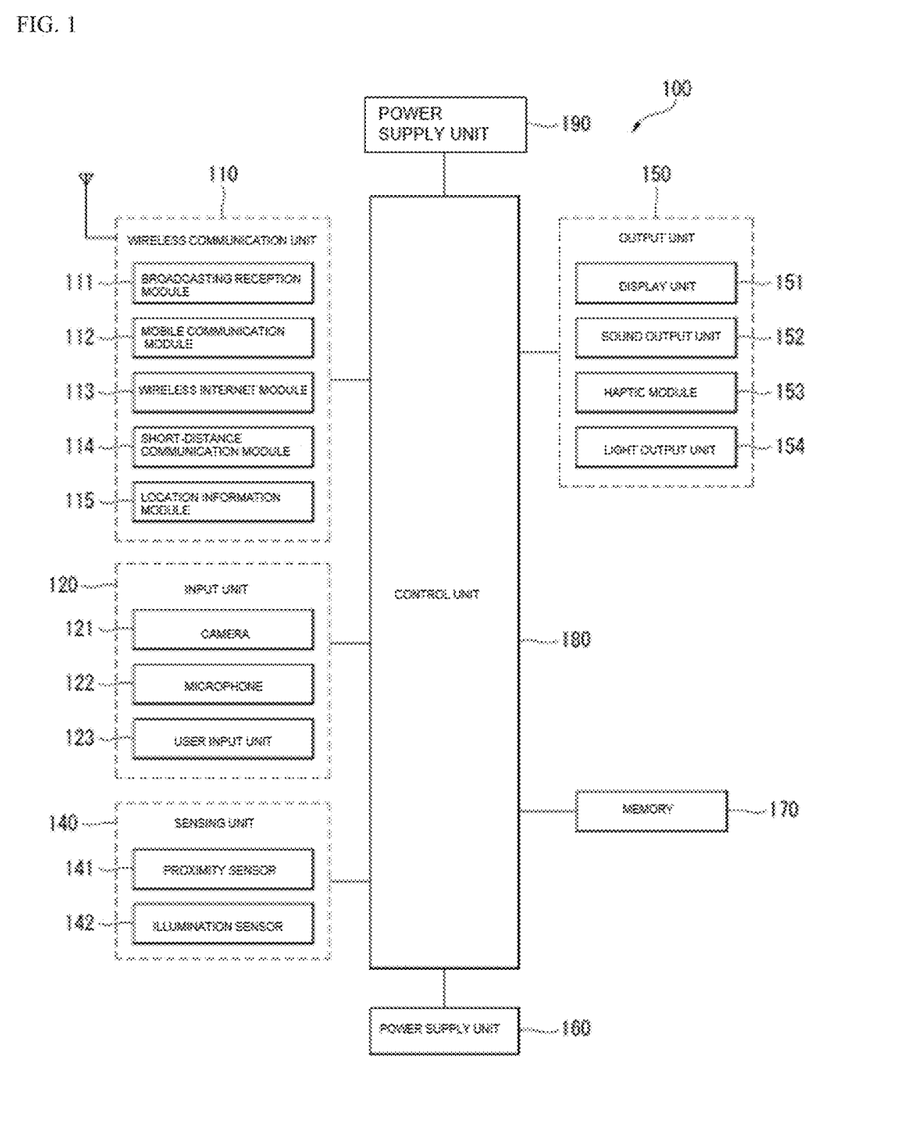
FIG. 1 is a block diagram for describing an electronic device related to the present disclosure.

FIG. 1 is a block diagram for describing an electronic device related to the present disclosure.

The electronic device 100 may include a wireless communication unit 110, an input unit 120, a sensing unit 140, an output unit 150, an interface unit 160, a memory 170, a control unit 180, a power supply unit 190, and the like. The components illustrated in FIG. 1 are not essential to implementing electronic devices, and the electronic devices described herein may have more or fewer components than those listed above.

More specifically, the wireless communication unit 110 of the components may include one or more modules which enable wireless communication between the electronic device 100 and a wireless communication system, between the electronic device 100 and other electronic devices 100, or between the electronic device 100 and an external server. In addition, the wireless communication unit 110 may include one or more modules which connect the electronic device 100 to one or more networks.

The wireless communication unit 110 may include at least one of a broadcast receiving module 111, a mobile communication module 112, a wireless Internet module 113, a short range communication module 114, and a location information module 115.

The input unit 120 may include a camera 121 or an image input unit for inputting an image signal, a microphone 122 or an audio input unit for inputting an audio signal, or a user input unit 123 (for example, a touch key, a mechanical key, or the like) for receiving information from a user. Voice data or image data collected by the input unit 120 may be analyzed and processed as a control command of a user.

The sensing unit 140 may include one or more sensors for sensing at least one of information in the electronic device, surrounding environment information around the electronic device, and user information. For example, the sensing unit 140 may include at least one of a proximity sensor 141, an illuminance sensor 142, a touch sensor, an acceleration sensor, a magnetic sensor, a gravity sensor (G-sensor), a gyroscope sensor, a motion sensor, an RGB sensor, an infrared sensor (IR sensor), a finger scan sensor, an ultrasonic sensor, an optical sensor (for example, a camera (see 121)), a microphone (see 122), a battery gauge, an environmental sensor (for example, a barometer, a hygrometer, a thermometer, a radiation detection sensor, a heat detection sensor, a gas detection sensor, and the like), and a chemical sensor (for example, an electronic nose, a healthcare sensor, a biometric sensor, and the like). Meanwhile, the electronic device disclosed herein may use a combination of information sensed by at least two or more of these sensors.

The output unit 150 is used to generate an output related to the sense of vision, the sense of hearing, the sense of touch, or the like, and may include at least one of a display unit 151, a sound output unit 152, a haptic module 153, and an optical output unit 154. The display unit 151 may form a mutual layer structure with the touch sensor or may be integrally formed with the touch sensor, thereby implementing a touch screen. The touch screen may function as the user input unit 123 which provides an input interface between the electronic device 100 and the user, and may provide an output interface between the electronic device 100 and the user.

The interface unit 160 serves as a path of various types of external devices connected to the electronic device 100. The interface unit 160 may include at least one of a wired/wireless headset port, an external charger port, a wired/wireless data port, a memory card port, a port for connecting devices including an identity module, an audio input/output (I/O) port, a video input/output (I/O) port, an earphone port, and the like. The electronic device 100 may perform appropriate control related to the connected external device in response to the connection of the external device to the interface unit 160.

In addition, the memory 170 stores data supporting various functions of the electronic device 100. The memory 170 may store a plurality of application programs (or applications) that are driven by the electronic device 100, and data and instructions for operating the electronic device 100. At least some of these application programs may be downloaded from the external server via the wireless communication. In addition, at least some of these application programs may exist on the electronic device 100 from the time of shipment for basic functions (for example, an incoming and outgoing call function and a message reception and transmission function) of the electronic device 100. Meanwhile, the application program may be stored in the memory 170 and installed on the electronic device 100, and thus may be driven by the control unit 180 to perform the operation (or function) of the electronic device.

In addition to the operation related to the application program, the control unit 180 typically controls the overall operation of the electronic device 100. The control unit 180 may provide or process appropriate information or a function for a user by processing signals, data, information, and the like, which are input or output through the above-described components, or by driving the application program stored in the memory 170.

In addition, the control unit 180 may control at least some of the components described with reference to FIG. 1 to drive the application program stored in the memory 170. In addition, the control unit 180 may operate at least two or more of the components included in the electronic device 100 in combination with each other to drive the application program.

The power supply unit 190 receives power from an external power supply and an internal power supply under the control of the control unit 180 and supplies the received power to each component included in the electronic device 100. The power supply unit 190 includes a battery, which may be a built-in battery or a replaceable type battery.

At least some of the components may operate in cooperation with each other in order to implement an operation, control, or a control method of the electronic device according to various embodiments to be described below. In addition, the operation, control, or control method of the electronic device may be implemented on the electronic device by driving at least one application program stored in the memory 170.

In the present disclosure, the electronic device 100 may include a terminal.

Figure 2:
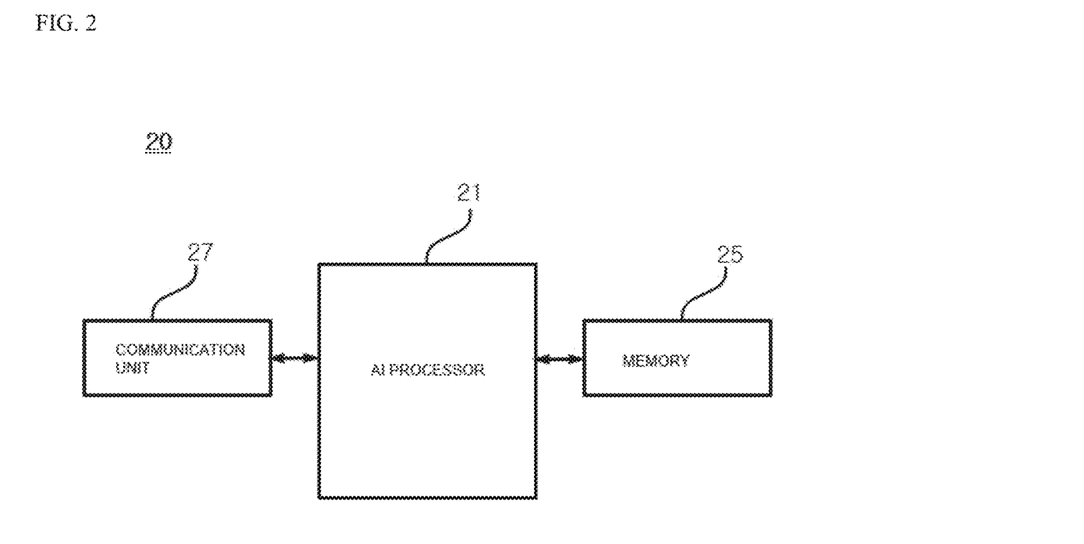
FIG. 2 is a block diagram of an artificial intelligence (AI) device according to an embodiment of the present disclosure.

FIG. 2 is a block diagram of an artificial intelligence (AI) device according to an embodiment of the present disclosure.

The AI device 20 may include an electronic device including an AI module capable of performing AI processing, a server including the AI module, or the like. In addition, the AI device 20 may be included in at least a part of the electronic device 100 shown in FIG. 1 and may be provided to perform at least a part of the AI processing together.

The AI device 20 may include an AI processor 21, a memory 25, and/or a communication unit 27.

The AI device 20 is a computing device capable of training neural networks, and may be implemented as any of various electronic devices such as a server, a desktop personal computer (PC), a notebook PC, and a tablet PC.

The AI processor 21 may train the neural network using a program stored in the memory 25.

Captcha is an authentication technology used to determine whether a user is an abnormal user from a bot or the like instead of a real person, and uses various methods, such as entering text and matching pictures, to identify normal users.

The AI processor 21 may generate an AI model for processing the Captcha capable of determining a crawler.

For example, in order to solve the Captcha that presents a character string, the AI model may train the presented character strings and perform a task of inputting a correct answer to the Captcha.

Meanwhile, the AI processor 21 performing the functions as described above may be a general purpose processor (for example, a central processing unit (CPU)), or may be an AI dedicated processor (for example, a graphics processing unit (GPU)) for training AI.

The memory 25 may store various programs and data necessary for the operation of the AI device 20. The memory 25 may be implemented as a non-volatile memory, a volatile memory, a flash-memory, a hard disk drive (HDD), a solid state drive (SDD), or the like. The memory 25 is accessed by the AI processor 21, and reading/writing/modification/deletion/update or the like of data by the AI processor 21 may be performed. Also, the memory 25 may store a neural network model (for example, a deep learning model) generated through a learning algorithm for data classification/recognition according to an embodiment of the present disclosure.

Meanwhile, the AI processor 21 may include a data learning unit that trains a neural network for data classification/recognition. For example, the data learning unit may acquire training data to be used for training, and apply the acquired training data to the deep learning model, thereby making it possible to train the deep learning model.

The communication unit 27 may transmit the AI processing result from the AI processor 21 to an external electronic device.

Here, the external electronic device may include other terminals and servers.

Meanwhile, although the AI device 20 illustrated in FIG. 2 has been described as being functionally classified into the AI processor 21, the memory 25, the communication unit 27, and the like, the above-described components are integrated into one module, which may be referred to as an AI module.

Figure 3A:
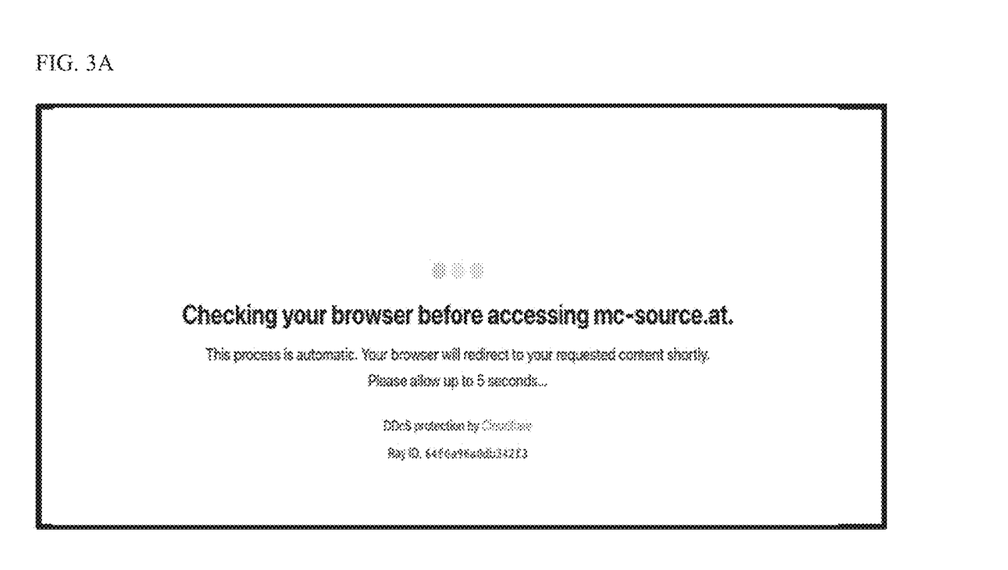
FIGS. 3A, and 3B is an example of bot detection and Captcha that may be applied to the present disclosure.
Figure 3B:
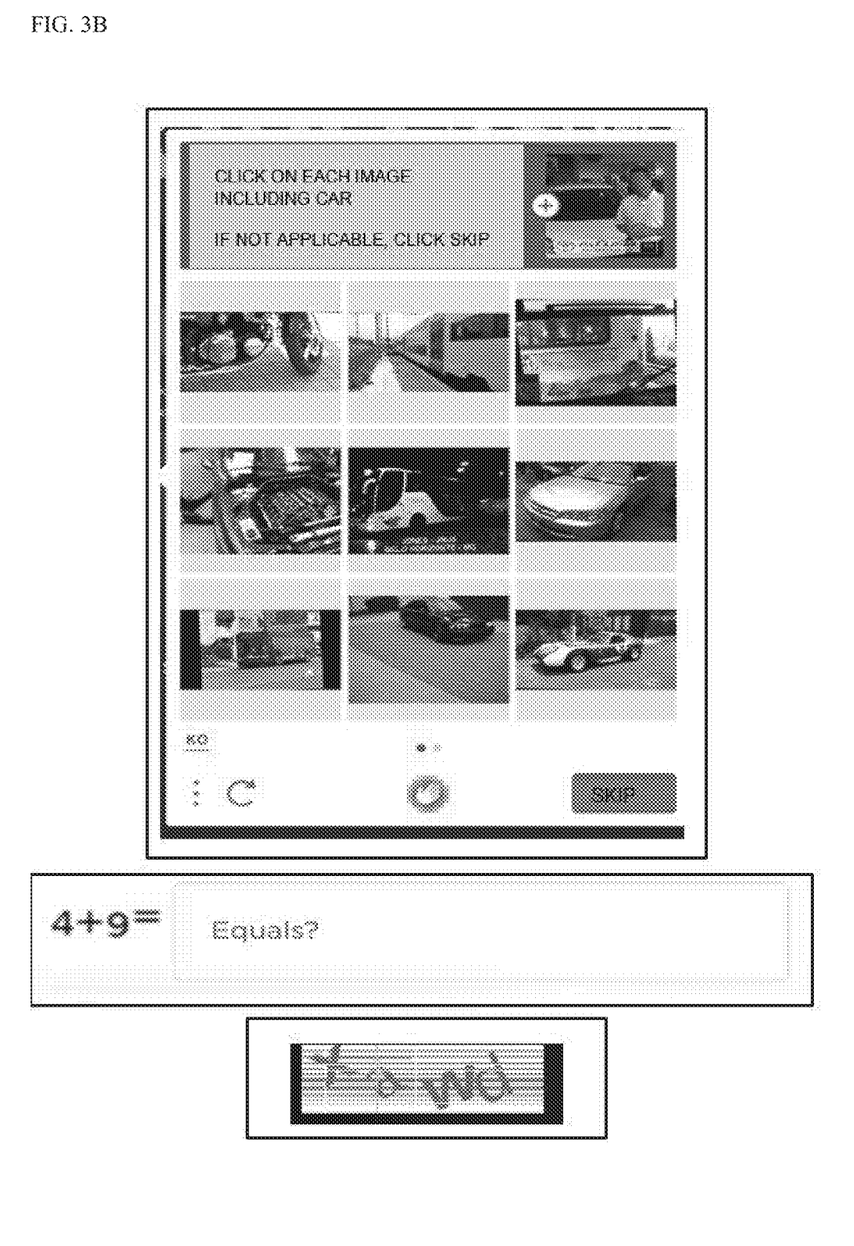

FIGS. 3A and 3B is an example of bot detection and Captcha that may be applied to the present disclosure.

Website operators who intend to deny crawling may block crawler access using the bot detection and the Captcha.

Referring to FIG. 3A, when a crawler randomly collects websites, the crawler may be detected as a bot, and thus the collection of the websites may be restricted. For example, when the bot looks at all html structures to check a form, the website may set the form to be invisible through cascading style sheets (CSS).

In this case, since the bot does not take into account that the form is invisible to humans through the CSS, the bot may check a hidden form, and the website may immediately determine that humans do not perform the collection and block the bot. When crawling is performed after account login, the account may be blocked.

Referring to FIG. 3B, when a crawler randomly collects a website, the Captcha may be checked, and since there are various types of Captchas, it is not easy for a crawler to solve various types of Captchas when performing crawling.

Figure 4:
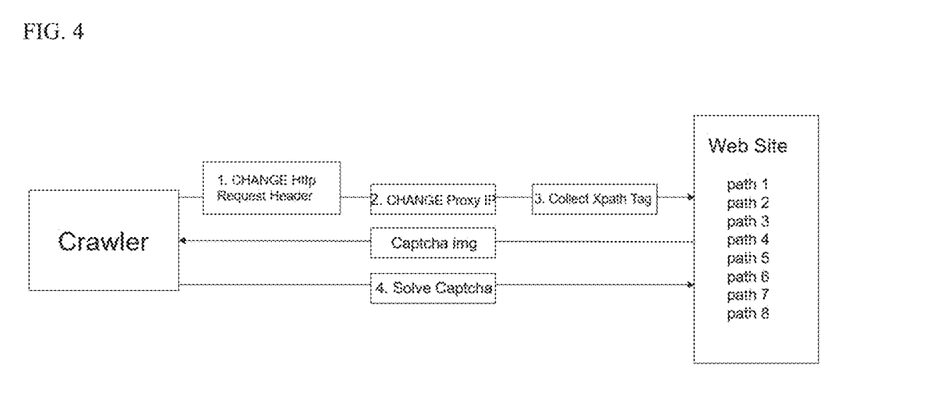
FIG. 4 is an example of a method of crawling a website to which the present disclosure may be applied.

FIG. 4 is an example of a method of crawling a website to which the present disclosure may be applied.

Referring to FIG. 4, the terminal may crawl the website by bypassing the bot detection and solving the Captcha through the crawler.

1. A crawler may manipulate a hypertext transfer protocol (HTTP) request header to mask the environment and state of the crawler when accessing a website (target site) that needs to be collected.

For example, a crawler may access a website by manipulating user-agent and referer among data included in the header.

More specifically, the HTTP header enables a client and a server to transmit additional information in a request or response. The header may be grouped as shown in Table 1 below according to context.

TABLE 1

| Name | Description |
| --- | --- |
| General header | Header that applies to both request and response but is not related to data ultimately transmitted in a body. |
| Request header | Header including detailed information on a resource to be fetched or a client itself. |
| Response header | Header including additional information on response, such as location or information on a server itself (name, version, etc.). |
| Entity header | Header including detailed information on an entity body, such as a content length or MIME type. |

Referring to Table 1, the HTTP Request header is an HTTP header used in an HTTP request but not related to content of a message, and may include user-agent (en-US) and referer.

The user-agent is a character string that enables a server and network peer to identify an application program, an operating system, a vendor and/or a version of the requesting user agent.

Table 2 below illustrates a format of user-agent in a web browser.

TABLE 2

User-Agent: <product> / <product-version> <comment>

Referring to Table 2, <product> may mean an identifier of a product, <product-version> may mean a version number of a product, and <comment> may mean a comment related to product information.

The referer may include an absolute or partial address of a page that transmits the current request. For example, when a resource request is entered through a link, an address of a page including the link may be included in this header, and when a resource request is sent to other domains, an address of a page using the resource may be included in this header.

Table 3 below shows the format of the referer.

TABLE 3

Referer: <url>

A website may restrict access to devices, software, and sites that restrict use by checking the above-described header. Therefore, a crawler may access websites using other user-agents that are known to be safe or are common. Also, a crawler may access a target website by changing a referer to a domain of the target website to be collected.

2. A crawler may access a website by periodically changing an Internet protocol (IP) using a proxy.

For example, a crawler may hide an IP of the crawler from a collection target server of the target website through a proxy server instead of one IP. As a result, it may be checked that new users continue to access the collection target server.

Figure 5:
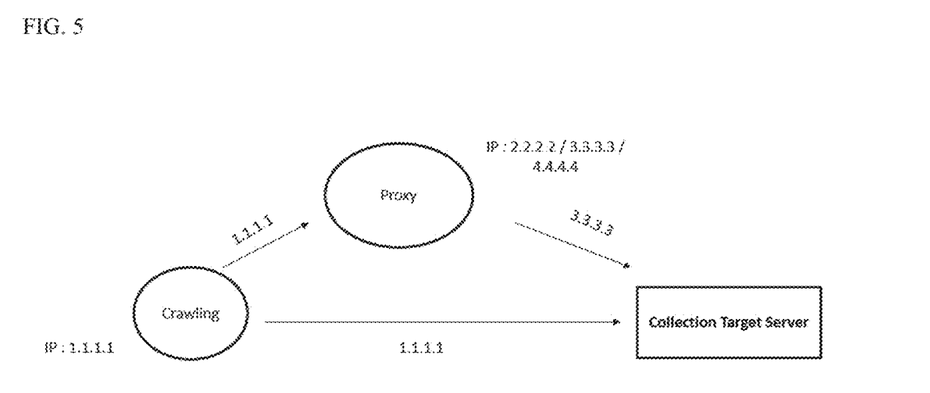
FIG. 5 is an example of periodically changing an Internet protocol (IP) to which the present disclosure may be applied.

FIG. 5 is an example of periodically changing an IP to which the present disclosure may be applied.

Referring to FIG. 5, when the crawler directly accesses the website, the collection target server may recognize the IP of the crawler. However, when accessing through a proxy server, the proxy server may hide both a crawler's IP address and the fact that the proxy server is being used. For example, the proxy server may use a dynamic IP, and thus a crawler may periodically access a website through different IP addresses.

3. Referring back to FIG. 4, a crawler may perform collection in a certain pattern through an xpath visible to a human eye in order to collect like a real person.

The xpath is a grammar that handles a method for a web to access recorded information, and the xpath may process all elements to be handled in units of nodes.

Table 4 below illustrates nodes of the xpath.

TABLE 4

| node | Characteristics |
| --- | --- |
| element node | Tag |
| node | Characteristics |
| attribute node | Attribute |
| text node | Content of tag |
| namespace node | Attribute in the form of xmlns:prefix = "URI" attached for identity of each tag |
| processing-instruction node | Execute any instruction (start with <? Tag) |
| comment node | Commentary |
| root node | Virtual node representing xml itself |

Figure 6:
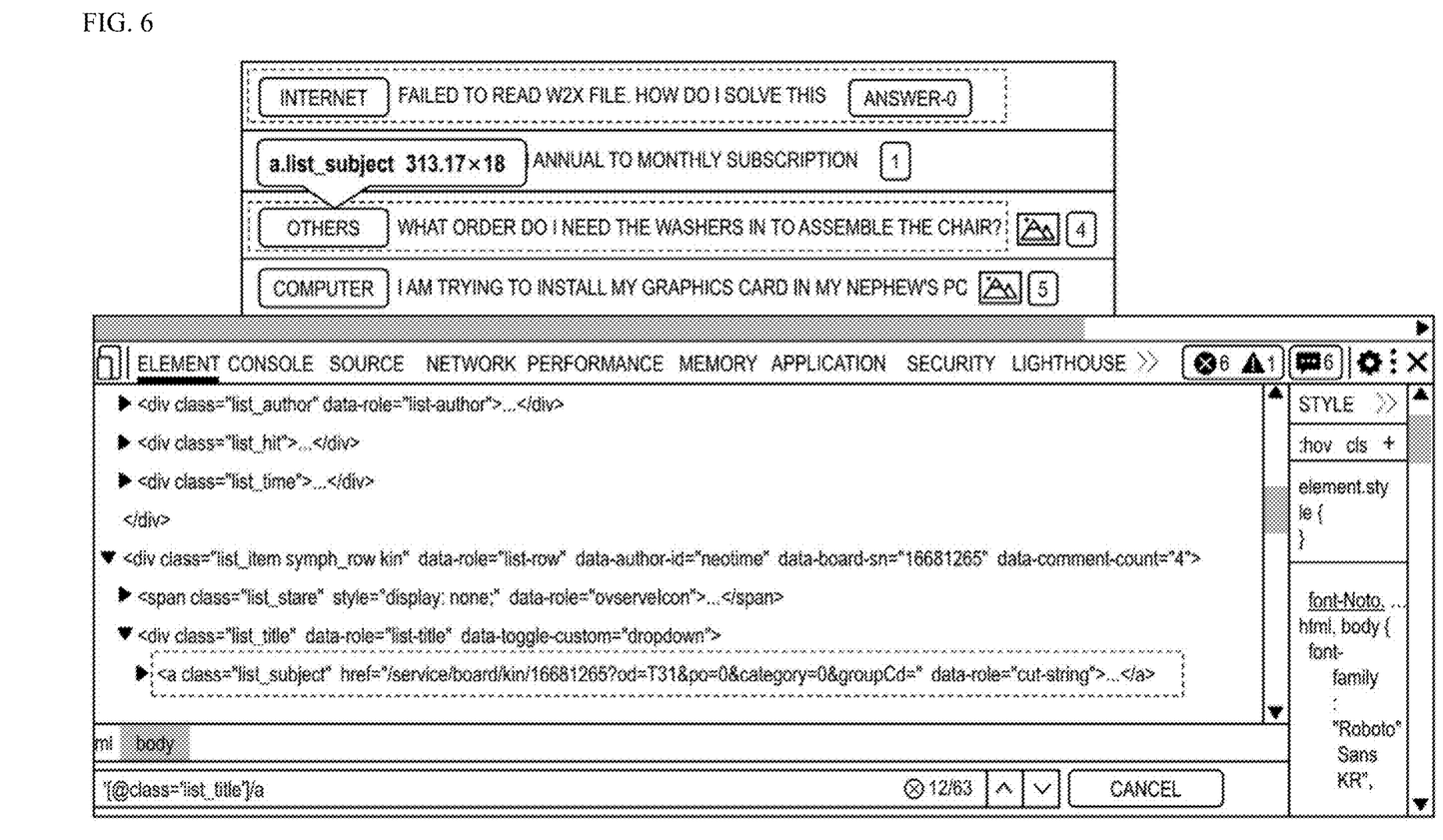
FIG. 6 is an example of a method of crawling using a path to which the present disclosure may be applied.

FIG. 6 is an example of a method of crawling using a path to which the present disclosure may be applied.

Referring to FIG. 6, a crawler collects tags from a configuration of an eXtensible markup language (XML) document corresponding to a configuration displayed on a user screen, and thus may proceed with collection by restricting a configuration to be crawled.

The crawler may perform crawling by finding a path in a similar way not only in the XML as illustrated, but also in documents composed in other languages (e.g., HTML).

4. Referring back to FIG. 4, a crawler may solve Captcha.

For example, when a crawler encounters Captcha while collecting data by performing crawling, a terminal automatically solves the problem with machine learning, or transmits messenger apps for problems that may not be trained or solved by machine learning, so a person may input a value corresponding to the Captcha and a crawler may automatically input the value transmitted by the person back to a website to access the website normally.

Figure 7:
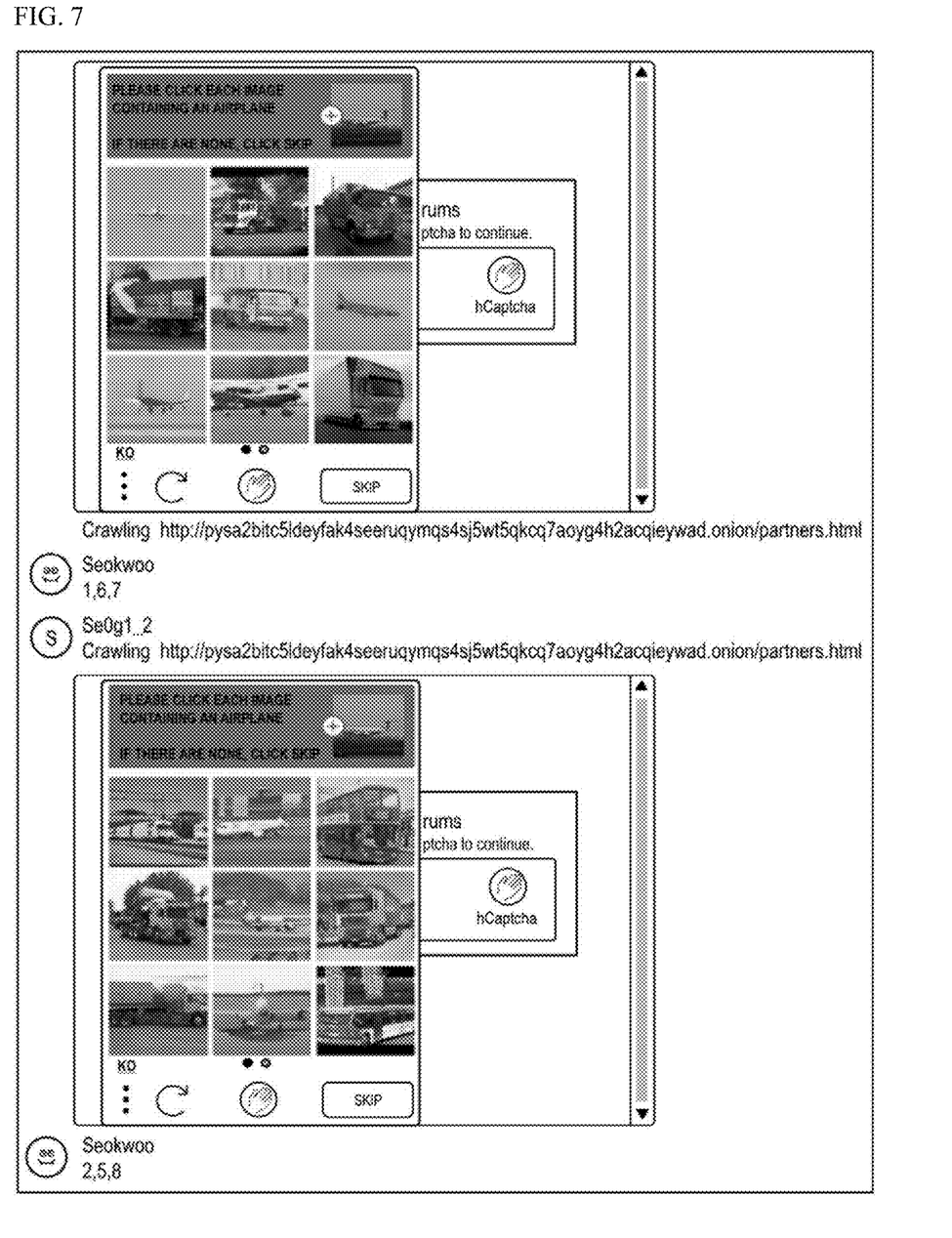
FIG. 7 is an example of a Captcha solving method to which the present disclosure may be applied.

FIG. 7 is an example of a Captcha solving method to which the present disclosure may be applied.

In the case of character string Captcha, the terminal may automatically solve the character string Captcha through continuous training (machine learning). The Captcha, which is not processed through an AI model, may be transmitted to a messenger bot, and thus may be solved by a person.

Referring to FIG. 7, for example, in the case of unsolved character string or Captcha clicked with the mouse, the terminal may transmit an image of the Captcha to a user by telegram, and the user may solve the Captcha by inputting a number corresponding to the image for solving the Captcha.

The above-described operation of the crawler may be performed by the terminal.

Figure 8:
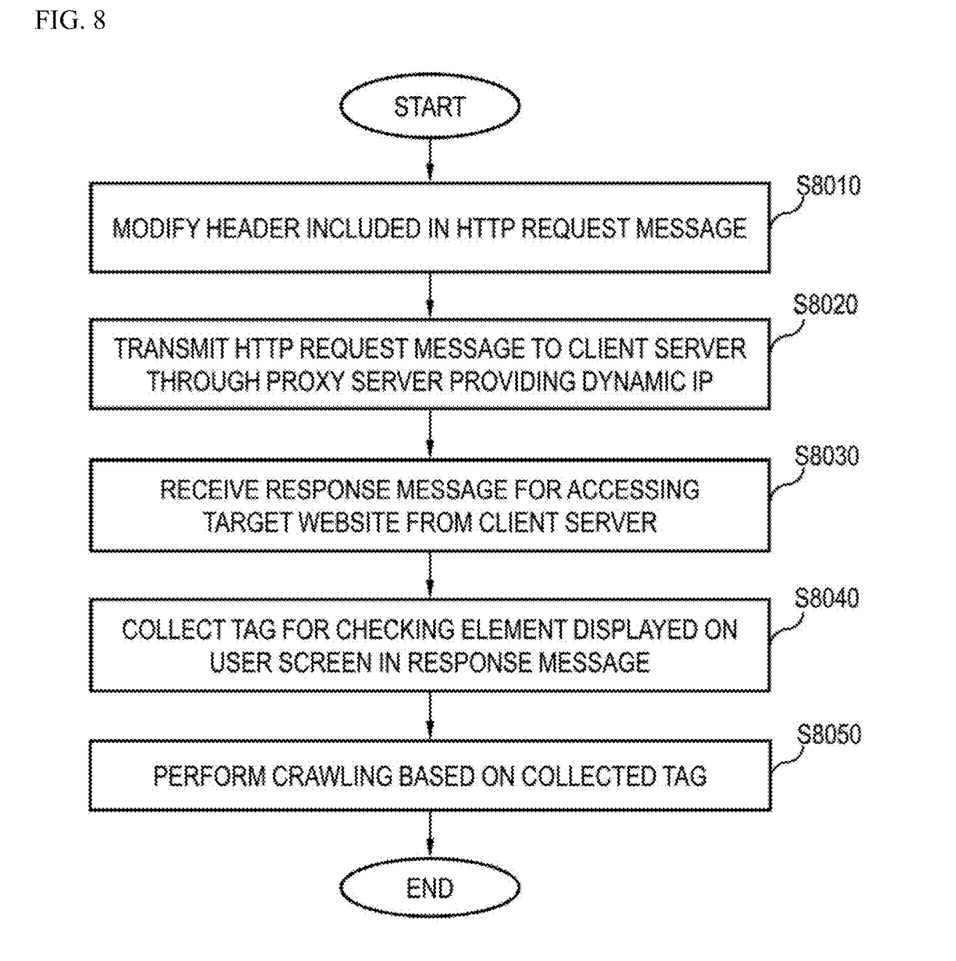
FIG. 8 is an embodiment of a terminal to which the present disclosure may be applied.

FIG. 8 is an embodiment of the terminal to which the present disclosure may be applied.

Referring to FIG. 8, the terminal may be connected to a network through a communication module to perform communication, and the memory may include software capable of performing a role of a crawler.

The terminal modifies the header included in the HTTP request message (S8010).

The header may include a first field (e.g., user-agent) for identifying the terminal and a second field (e.g., referer) including an access address of the terminal.

The terminal transmits an HTTP request message to a client server through the proxy server that provides the dynamic IP (S8020). For example, the proxy server may be a high anonymous (ELITE) proxy server. The client server may provide a target web page.

The terminal receives a response message for accessing a target website from the client server (S8030). For example, the response message may include an element of the target web page. The target web page may be configured using XML, HTML, or the like.

The terminal collects a tag for checking an element displayed on a user screen in the response message (S8040).

The terminal performs crawling based on the collected tag (S8050). For example, the terminal may check, through the tag, a path corresponding to an element that a user may check through the screen, and may crawl a configuration corresponding to the checked path.

When the terminal receives an image for checking the Captcha, the terminal may solve the Captcha included in the image through the AI model. When the Captcha solution fails, the terminal may transmit an image to the user through the SNS, receive an input value for solving the Captcha from the user, and solve the Captcha through the input value.

As a result, the terminal may bypass bot detection without exposing crawler information during collection of web pages, and safely crawl account blocking and IP blocking. In addition, it is possible to automatically solve the Captcha without directly inputting the Captcha character string on the web page, and to solve the Captcha by interacting with a user through the messenger app when the Captcha may not be solved automatically.

The present disclosure described above permits the program to be embodied as computer readable code on a medium on which the program is recorded. Computer readable media may include all kinds of recording devices in which data that may be read by a computer system is stored. An example of the computer readable medium may include a hard disk drive (HDD), a solid state disk (SSD), a silicon disk drive (SDD), a read only memory (ROM), a random access memory (RAM), a compact disc read only memory (CD-ROM), a magnetic tape, a floppy disk, an optical data striate, or the like, and also include a medium implemented in the form of carrier waves (for example, transmission through the Internet). Therefore, the above-described detailed description is to be interpreted as being illustrative rather than being restrictive in all aspects. The scope of the present disclosure should be determined by reasonable interpretation of the appended claims, and all changes within the equivalent scope of the present disclosure are included in the scope of the present disclosure.

According to an embodiment of the present disclosure, it is possible to provide a method and apparatus for crawling a website by bypassing bot detection.

Effects which may be achieved by the present disclosure are not limited to the above-described effects. That is, other objects that are not described may be obviously understood by those skilled in the art to which the present disclosure pertains from the following description.

In addition, although services and embodiments have been mainly described hereinabove, this is only an example and does not limit the present disclosure. Those skilled in the art to which the present disclosure pertains may understand that several modifications and applications that are not described in the present disclosure may be made without departing from the essential characteristics of the present services and embodiments. For example, each component described in detail in the embodiments may be modified. In addition, differences associated with these modifications and applications are to be interpreted as being included in the scope of the present disclosure as defined by the following claims.

What is claimed is:

1. A method of crawling a website by a terminal including a processor, a communication unit and a memory storing an artificial intelligence model, the method comprising:
    modifying, by the terminal, a header included in a hypertext transfer protocol (HTTP) request message to avoid bot detection;
    transmitting, by the terminal, via the communication unit, the HTTP request message to a client server through a proxy server providing a dynamic Internet protocol (IP);
    receiving, by the terminal, via the communication unit, a response message for accessing the website from the client server, wherein the response message includes information on a configuration of a web page of the website;
    obtaining, by the terminal, a tag for checking an element displayed on a user screen of the terminal based on the information on the configuration of the web page included in the received response message;
    checking, by the terminal, through the tag, a path corresponding to the element that is displayed on the user screen and can be checked by a user through the user screen; and
    performing, by the terminal, the crawling based on the checked path,
    wherein the method further comprises:
    when a character string Captcha is encountered during the crawling, automatically solving the character string Captcha through the artificial intelligence model stored in the memory,
    when a different type of Captcha than the character string Captcha is encountered during the crawling, (i) receiving an image for checking the different type of Captcha via the communication unit, (ii) transmitting the image for checking the different type of Captcha to the user through a messenger application, and (iii) solving the different type of Captcha by interacting with the user through the messenger application,
    wherein the header of the HTTP request message includes a first field corresponding to user-agent and a second field corresponding to referer, the referer indicating an address of a web page from which a resource request is sent to the client server, and
    wherein the modifying of the header includes:
    modifying the user-agent, and
    modifying the address of the web page in the referer to a domain address of the website.

2. The method of claim 1, wherein the proxy server is a high anonymous proxy server.

3. The method of claim 2, wherein the response message includes an element of the website expressed in a programming language.

4. A terminal for crawling a website, comprising:
    a communication module;
    a memory including an artificial intelligence model; and
    a processor configured to functionally control the memory,
    wherein the processor is further configured to:
    modify a header included in a hypertext transfer protocol (HTTP) request message to avoid bot detection,
    transmit, via the communication module, the HTTP request message to a client server through a proxy server providing a dynamic IP,
    receive, via the communication module, from the client server, a response message for accessing the website, wherein the response message includes information on a configuration of a web page of the website,
    obtain a tag for checking an element displayed on a user screen of the terminal based on the information on the configuration of the web page included in the received response message,
    check, through the tag, a path corresponding to the element that is displayed on the user screen and can be checked by a user through the user screen, and
    perform the crawling based on the path,
    wherein the processor is further configured to:
    when a character string Captcha is encountered during the crawling, automatically solve the Captcha through the artificial intelligence model in the memory,
    when a different type of Captcha than the character string Captcha is encountered during the crawling, (i) receive an image for checking the different type of Captcha via the communication unit, (ii) transmit the image for checking the different type of Captcha to the user through a messenger application, and (iii) solve the different type of Captcha by interacting with the user through the messenger application, wherein the header of the HTTP request message includes a first field corresponding to user-agent and a second field corresponding to referer, the referer indicating an address of a web page from which a resource request is sent to the client server, and wherein the modifying of the header includes:

modifying the user-agent, and modifying the address of the web page in the referer to a domain address of the website.

5. The method of claim 1, further comprising, when the solution of the character string Captcha through the artificial intelligence model fails, (i) receiving an image for checking the character string Captcha via the communication unit, (ii) transmitting the image for checking the character string Captcha to the user through the messenger application, and (iii) solving the character string Captcha by interacting with the user through the messenger application.

6. The terminal of claim 4, wherein the processor is further configured to:

when the solution of the character string Captcha through the artificial intelligence model fails, (i) receive an image for checking the character string Captcha via the communication unit, (ii) transmit the image for checking the character string Captcha to the user through the messenger application, and (iii) solve the character string Captcha by interacting with the user through the messenger application.

\* \* \* \* \*